United States Patent [19]
Stagnitto

[11] Patent Number: 6,111,384
[45] Date of Patent: *Aug. 29, 2000

[54] METHOD FOR CONTROLLING MOTOR SPEED

[75] Inventor: Joseph E. Stagnitto, Rochester, N.Y.

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/084,745

[22] Filed: May 26, 1998

[51] Int. Cl.[7] ................................................. G05B 19/29
[52] U.S. Cl. .......................... 318/602; 318/603; 388/815; 388/907.5; 388/911
[58] Field of Search .................................. 388/800–815, 388/911, 907.5; 318/600–610

[56] References Cited

U.S. PATENT DOCUMENTS

| | | | |
|---|---|---|---|
| 4,359,675 | 11/1982 | Miller | 318/603 |
| 5,198,732 | 3/1993 | Morimoto | 318/116 |
| 5,212,434 | 5/1993 | Hsieh | 318/603 |
| 5,220,266 | 6/1993 | Kobayashi | 318/799 |

OTHER PUBLICATIONS

A Phase–Locked Loop Motor Control System by David H. Smithgall, IEEE, Nov. 1975.
Multifunction Chip Steers Hard Disk Drives, by Robert E. Holm, published in the Electronic System Design Magazine, Apr. 1988.
Motor Control & Driver IC Series, 1987 Toshiba Databook.

*Primary Examiner*—David Martin
*Attorney, Agent, or Firm*—Susan L. Parulski

[57] ABSTRACT

A method of controlling motor speed. The motor speed control apparatus includes an encoder in mechanical association with the motor. The encoder has one channel providing an encoder signal having a rising and falling state transition for each period of the encoder signal. The periodic frequency of the state transitions are used to precisely measure instantaneous motor speed. A comparitor then compares the periodic frequency with a predetermined motor speed to provide an error signal, representative of the difference. A feedback control system affects the motor speed dependent on the error signals. In a further embodiment, the encoder includes two channels and four state transitions.

5 Claims, 4 Drawing Sheets

METHOD FOR CONTROLLING MOTOR SPEED

FIELD OF THE INVENTION

The present invention relates generally to a servo control apparatus and method, and more particularly to a signal processing method for precision velocity servo control.

BACKGROUND OF THE INVENTION

Various methods have been employed to control the velocity of a motor, including motors used in an image forming apparatus such as a scanner, printer, or electrophotographic copying apparatus. Such image forming apparatus require precision control of the motor velocity to form a quality image. For example, when printing an image, precise control of the relative velocity (in the printing direction) between the printer and the media on which the image is being formed is required. Since the relative velocity is generally low, precision control of motors operating at a slow speed may be preferable to reduce/eliminate the need for potentially expensive mechanical speed reduction suitable to meet the velocity regulation requirements.

Stepper motors have been employed, but have significant limitations to their performance. To overcome some of these limitations, a Phase Lock Loop (PLL) motor speed servo controller with an incremental optical encoder for position feedback can be employed. Use of PLL controllers for precision motor speed control is known to those skilled in the art. For example, U.S. Pat. No. 5,212,434 describes a speed controller utilizing a phase-locked stepping servomechanism. A reference by D. H. Smithgall titled "A Phase-Locked Loop Motor Control System", IEEE, November 1975, describes the use of an analog circuit to measure phase error between a stable time reference and the signature from an encoder coupled to the motor.

A reference by R. E. Holm titled "Multifunction Chip Steers Hard Disk Drives", Electronic System Design Magazine, April 1988, describes a motor control method using a microcontroller to measure motor velocity by using a counter and a higher frequency clock to make time period measurements of an encoder. That is, the controller makes precision time measurements for when transitions of the encoder signal occur, compares the time measurements to a stable time reference, and provides a torque correction signal which is derived from a variation of a PID (Proportional plus Integral plus Derivative) calculation on the error. The motor speed is regulated by the calculated error. The quality and resolution of the encoder is critical if this method is employed. The encoder requires incremental position feedback sufficiently frequent to support the servo controller requirements to regulate velocity and reject disturbances that might cause velocity variations.

While such apparatus may have achieved certain degrees of success in their particular applications, current methods of motor control do not optimize the use of encoder information.

Accordingly, a need continues to exist for a method for obtaining more and better information from an optical encoder for controlling the speed of a motor.

SUMMARY OF THE INVENTION

An object of the present invention is to provide a method for optimizing the use of encoder information for controlling the speed of a motor.

Another object of the invention is to provide such a method wherein more and better information is obtained from an optical encoder for precision motor velocity control systems.

Still another object of the invention is to provide a method that optimizes the velocity measurement capability, and consequently, the performance of a particular system at a given speed setting.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided a method for controlling motor speed. The method includes providing an encoder in mechanical association with a motor, the encoder having a first encoder channel. A first periodic encoder signal is generated from the first encoder channel representative of instantaneous motor positions from which corresponding instantaneous motor speeds can be derived; the first encoder signal has a rising and a falling state transition for each period of the first encoder signal. Alternatingly, a frequency of the rising and falling state transitions is determined; the frequency of the rising and falling state transitions is representative of a first and second instantaneous motor speed, respectively. The first and second instantaneous motor speeds are compared with a predetermined motor speed and a first and second error signal are generated, respectively, representative of the difference. The speed of the motor is alternately affected dependent on the first and second error signals.

According to another aspect of the invention, there is provided a method for controlling motor speed wherein a frequency of a state transition is determined over a multiple period interval. The method includes providing an encoder in mechanical association with a motor, the encoder having a first encoder channel generating a first encoder signal having a period P representative of instantaneous motor positions from which corresponding instantaneous motor speeds can be derived. The first encoder signal has at least one state transition for each period of the first encoder signal. A frequency of the state transition is determined over a multiple period interval nP wherein n is an integer greater than 1. The frequency of the state transition is representative of an instantaneous motor speed. The instantaneous motor speed is compared with a predetermined motor speed and an error signal is generated representative of the difference. The speed of the motor is affected dependent on the error signal.

According to a further aspect of the invention, there is provided a method for controlling motor speed wherein the encoder has a first and second encoder channel. A first and second periodic encoder signal are generated from the first and second encoder channel, respectively. The first encoder signal has a first and a second state transition for each period of the first encoder signal, while the second encoder signal has a third and a fourth state transition for each period of the second encoder signal. The frequency of the first, second, third, and fourth state transitions are alternatingly determined wherein the frequency of the first, second, third, and fourth state transitions are representative of a first, second, third, and fourth instantaneous motor speed, respectively. The first, second, third, and fourth instantaneous motor speeds are then compared with a predetermined motor speed and a first, second, third, and fourth error signal are generated, respectively, representative of the difference. The speed of the motor is alternatingly affected dependent on the first, second, third, and fourth error signals.

According to a still further aspect of the invention, there is provided a method of controlling motor speed, comprising providing an operational speed of a motor; operating the motor at a calibration speed which is greater than the operational speed, the calibration speed having a nominal period P; measuring each actual quarter period ¼P; determining and storing a correction factor for each quarter period ¼P to normalize the quarter period ¼P; and operating the motor at the operational speed utilizing the correction factor.

The present invention provides a method for obtaining more and better information from an optical encoder for controlling the speed of a motor. More particularly, it optimizes the use of encoder information.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
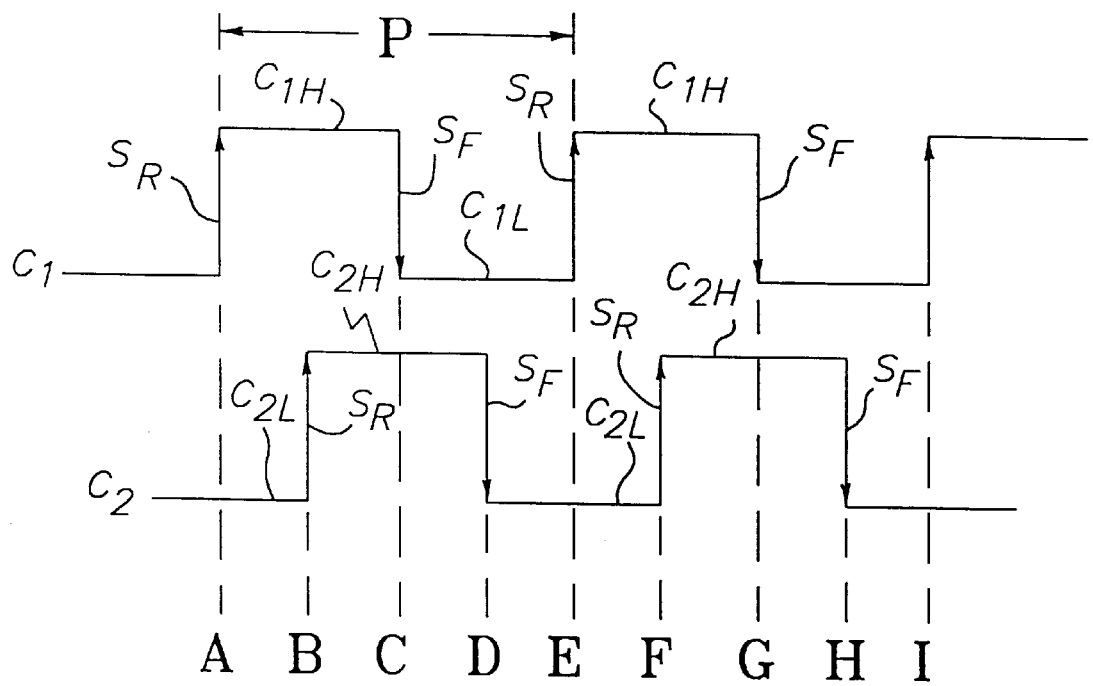
FIG. 1 shows a signature of a two-channel optical encoder in quadrature.

The following is a detailed description of the preferred embodiments of the invention, reference being made to the drawings in which the same reference numerals identify the same elements of structure in each of the several figures.

An optical encoder is a well known electromechanical device used to monitor the motion of an operating mechanism. Speed transducers employed for detecting the angular speed of a motor are typically of a type which utilizes an optical encoder. The optical encoder is functionally equivalent to a frequency multiplier. That is, a complete revolution of a shaft of the motor actuates the optical encoder to generate a predetermined number of pulses. The predetermined number is technically referred to as a line count of the optical encoder. Therefore, the angular speed of the motor can be determined by measuring the frequency, i.e., pulses per second, of the output pulse train of the optical encoder. The larger the line count, the higher the speed measurement resolution becomes.

An optical encoder may employ two encoder channels. A typical signature of a two-channel optical encoder in quadrature is illustrated in FIG. 1. A signal of a first channel $C_1$ and a second channel $C_2$ are shown. Each channel's signal has two states for one period P: high H and low L. The signals of the two channels are phase shifted relative to each other, typically by ¼ period P. Accordingly, this provides four particular states which can be decoded, and therefore, the two-channel optical encoder is said to be in quadrature. These four states will hereinafter be referred to as $C_{1H}$, $C_{1L}$, $C_{2H}$, and $C_{2L}$. Transitions occur between the states, at the rising/falling edges. Each of these transitions may be referred to as a state transition S. Referring to FIG. 1, a rising state transition $S_R$ of Channel 1 is referenced by the letters A and E, while a falling state transition $S_F$ of Channel 1 is referenced by the letters C and G. A rising state transition $S_R$ Of Channel 2 is referenced by the letters B and F, while a falling state transition $S_F$ of Channel 2 is referenced by the letters D and H.

When the encoder is properly coupled to the motor, the encoder provides a useful output signal that precisely corresponds to incremental changes in the motor's position by generating a periodic signal whose rising and falling state transitions have a known and exact relationship to the mechanical motion. The frequency of this periodic signal precisely indicates the number of incremental position changes per unit time, and thus, precisely indicates the motor's speed. The average speed over the last period can be determined by measuring the time for that period and calculating it's frequency as $1/T_{period}$. With a relatively high resolution encoder, the time period can be sufficiently small so as to consider the velocity measurement to be instantaneous.

The interval between the state transitions of first channel $C_1$ and the state transitions of second channel $C_2$ represents the phase relationship between the two channels. This phase relationship may nominally be ¼ period P or 90 electrical degrees, but has a high degree of variability. Similarly, there may be a high degree of variability of the intervals between rising state transitions $S_R$ and falling state transition $S_F$ of one channel. For example, for first channel $C_1$, there may be variability between the intervals of A–C and E–G. Because of this variability, the speed information obtained from the optical encoder by measuring the intervals between the state transitions may not be precise. The error resulting from the interval variability may be much greater than an error resulting from a full period measurement (i.e., the measurement between "like" state transitions of a single channel, for example, the interval A–E and E–I of first channel $C_1$). Because of this, Phase Lock Loop (PLL) controllers typically use the latter. That is, they typically use "like" state transitions such as only rising edges $S_R$ or only falling edges $S_F$ on a single channel for the speed measurements. Thus, for slow motor speeds, high optical line resolution encoders may be required to achieve the desired motor performance.

The present invention provides a means for optimizing the use of the available optical encoder information. Precise measurements for a previous period P can be made at each of the state transitions between the four states that occur during every electrical cycle, and can be used to precisely determine an encoder channel frequency, and thus, the motor's rotational velocity. When two encoder channels $C_1$, $C_2$ are employed, the present invention utilizes data which is available four times more frequently than from convention PLL motor speed controllers.

Thus, several embodiments, and combinations thereof, of the present invention may be employed. For example, one or both channels $C_1$, $C_2$ may be employed, allowing for one, two, three, or four periodic measurements to be made for each electrical cycle. In addition, data may be taken every period P of the channel(s), or at multiples of the period. General examples are now provided.

EXAMPLE 1

Single Channel with Measurements made at both State Transitions

Figure 2:
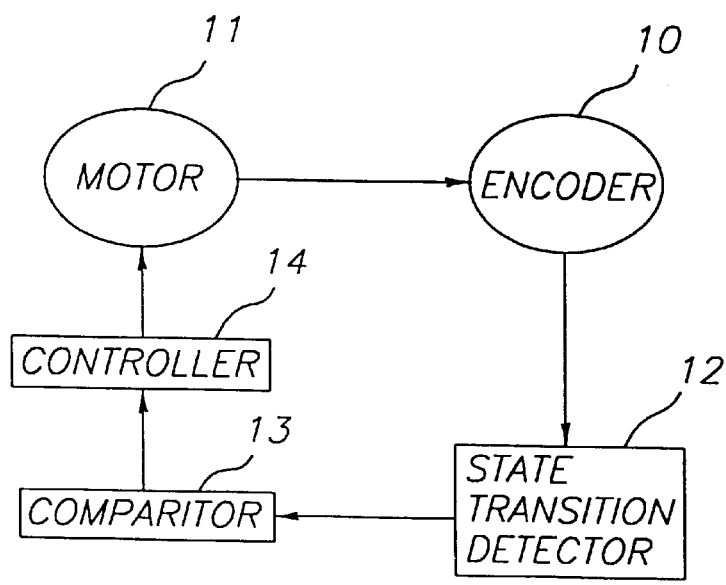
FIG. 2 shows a first embodiment of a motor speed control apparatus in accordance with the present invention.
Figure 3:
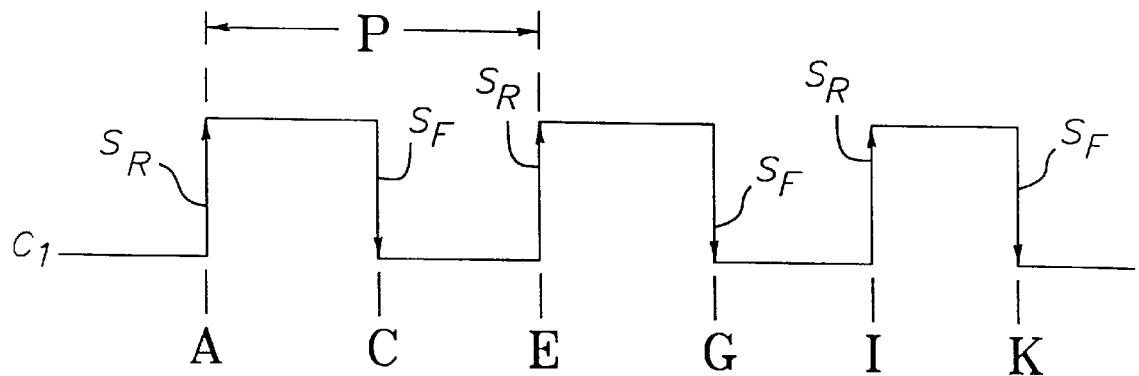
FIG. 3 shows a signature of a single-channel optical encoder corresponding with the apparatus shown in FIG. 2.

Referring to FIGS. 2 and 3, a motor speed control apparatus includes an encoder 10 in mechanical association with a motor 11. Encoder 10 has a first channel $C_1$ providing a first periodic encoder signal as illustrated in FIG. 3. This encoder signal is representative of an instantaneous motor position from which a corresponding instantaneous motor speed can be derived by measuring the time between changes in motor position. As illustrated in FIG. 3, the encoder signal has a plurality of rising $S_R$ and falling $S_F$ state transitions. A state transition detector 12 determines the periodic frequency for each of the rising $S_R$ and falling $S_F$ state transitions. For example, for the encoder signal illustrated in FIG. 3, the periodic frequency would be determined for intervals A-E, C-G, E-I, etc. The periodic frequency measured for each of the state transitions is representative of a new motor speed. A comparator 13 compares each new motor speed with a selected predetermined motor speed (i.e., desired operational motor speed) and provides an error signal to a controller 14. The error signal can be representative of the difference between the new motor speed and the predetermined motor speed. The speed of the motor is changed, dependent on the error signal. For example, controller 14 can provide a correction signal to control the motor speed dependent on the error signal. Various control methods/algorithms, known to those skilled in the art, may be employed to modify the motor speed dependent on the error signal.

In operation, the motor speed is controlled by first determining the periodic frequency of rising state transition $S_R$ for each period of the encoder signal; the frequency being representative of a first motor speed. For example, A-E. Comparitor 13 is used to compare the first motor speed with the predetermined motor speed, and generate a first error signal representative of the difference. The motor speed is then affected dependent on the first error signal. These steps are then repeated for falling state transition $S_F$ for each period of the encoder signal. For example, C-G. As such, the determination of the periodic frequency alternates between the rising and falling state transitions. For example, as illustrated in FIG. 3, the periodic frequency of rising state transition $S_R$ of E-I would next be determined, followed by falling state transition $S_F$ G-K.

Consequently, at each and every rising $S_R$ and falling $S_F$ state transition, a new full period measurement is made to provide a precise measurement of motor speed. Thus, the present invention provides twice the measurement rate as that of a conventional PLL controller.

EXAMPLE 2

Figure 4:
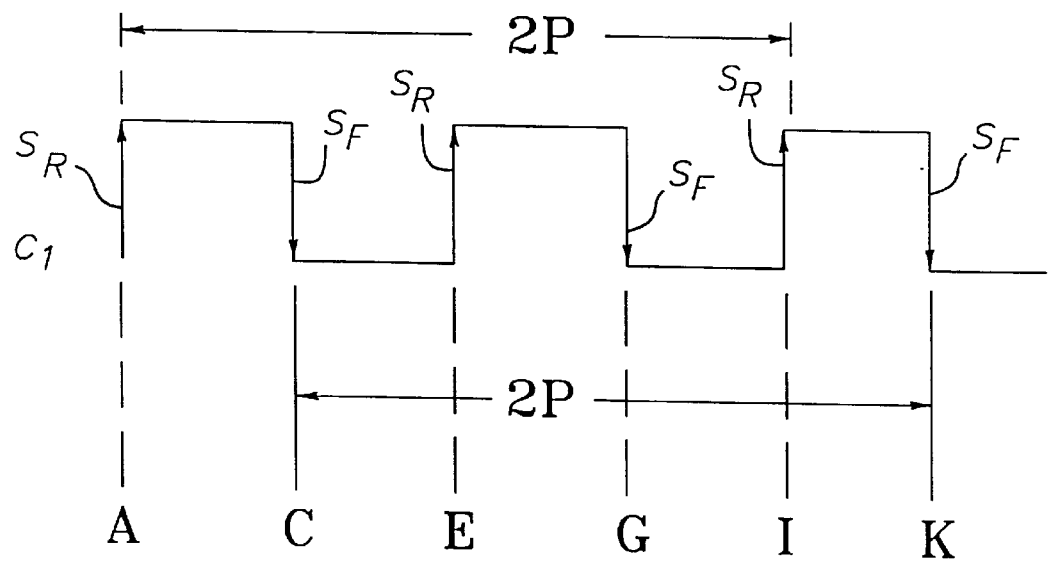
FIG. 4 shows a signature of a single-channel optical encoder indicating a two-period time interval.

Single Channel with Measurements made at one State Transition over Multiple Periods The motor speed control apparatus of FIG. 2 is employed. However, in operation, the frequency of rising $S_R$ and/or falling $S_F$ state transition is determined over a multiple period interval. That is, over an internal of nP where n is an integer greater than 1 (e.g., 2, 3, 4) and P is the period. FIG. 4 illustrates a determination interval of 2P. Thus, the interval A-I would be used for rising state transition $S_R$ and interval C-K would be used for falling state transition $S_F$.

Such a determination interval may be appropriate when the periodic frequency is higher, and thus the time interval shorter, than would provide sufficient resolution of measurement for periodic frequency with a given measurement clock. For example, assume a measurement resolution of 0.01% is required and a 10 MHz clock is used to measure the periodic frequency. The 10 MHz clock provides a 0.1 μs resolution of measurement. Consequently, the shortest full period measurement that could be made is 1 millisecond (i.e., 0.1 μs/0.01%). This would be suitable for a 1 KHz or less encoder signal. Accordingly, if a motor is to be controlled such that it's encoder periodic frequency would be 1.5 KHz, a measurement over 2 periods would be required to achieve the resolution

EXAMPLE 3

Two Channels with Measurements made at both State Transitions

Figure 5:
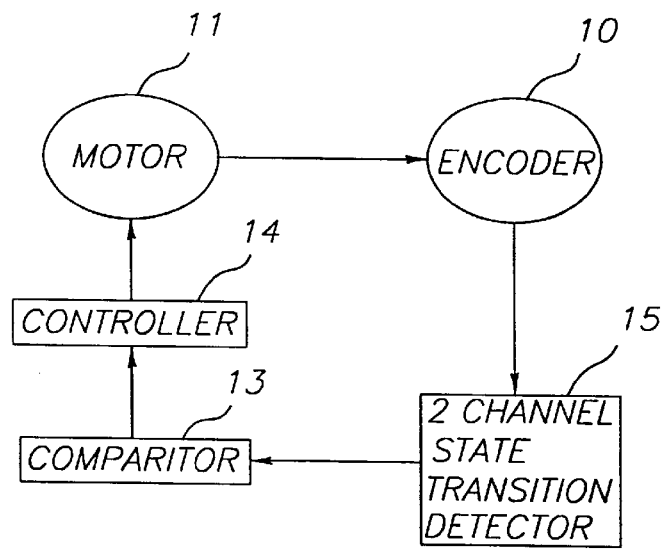
FIG. 5 shows a second embodiment of a motor speed control apparatus in accordance with the present invention.
Figure 6:
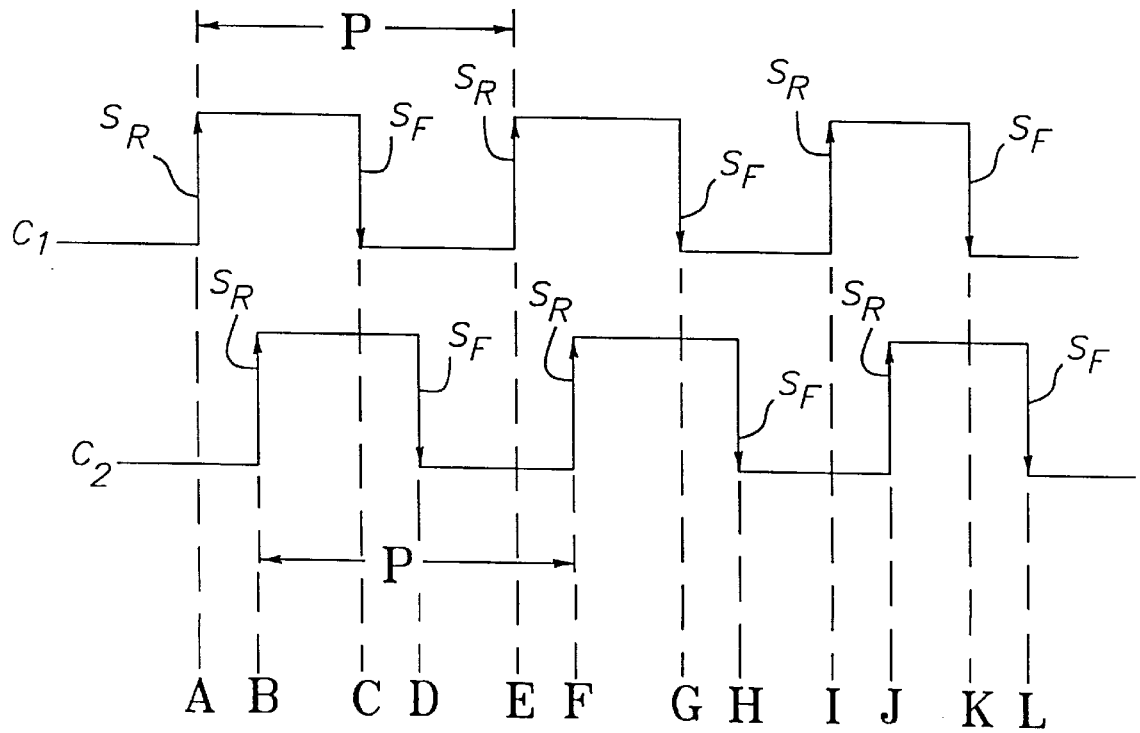
FIG. 6 shows a signature of a two-channel optical encoder corresponding with the apparatus shown in FIG. 5.

Referring now to FIGS. 5 and 6, the motor speed control apparatus includes encoder 10 in mechanical association with motor 11. Encoder 10 has a first and second channel $C_1, C_2$ providing a first and second periodic encoder signal, respectively, as illustrated in FIG. 6. This encoder signal is representative of an instantaneous motor position from which a corresponding instantaneous motor speed can be derived by measuring the time between changes in motor position. As illustrated, the encoder signal has a plurality of rising $S_R$ and falling So state transitions. A two channel state transition detector 13 determines the periodic frequency for each rising $S_R$ and falling $S_F$ state transition for the two encoder signals. For example, the periodic frequency would be determined for intervals A-E, B-F, C-G, D-H, etc. Each successive frequency measurement is representative of the newest motor speed. Consequently, the motor speed is being measured four times more frequently than conventional controllers. A comparator 13 compares each new motor speed with a predetermined motor speed and provides a corresponding error signal to a controller 14. Controller 14 controls the motor speed dependent on the error signals. The error signals are updated for the newest measurement of motor speed at four times the normal rate. This reduces the feedback delay time to the motor, thereby providing better motor speed control.

In operation, the motor speed is controlled by determining the periodic frequency of the rising $S_R$ and falling $S_F$ state transitions for each period of the two encoder signals; the frequency being representative of a motor speed. Comparitor 13 compares the motor speed with the predetermined motor speed, and generates the error signal representative of the difference. The motor speed is then affected dependent on the error signal. These steps are repeated for each state transition.

Speed Selection

A particular embodiment of the present invention is now described which is directed to the speed selection. For ease of discussion only, numerical values will be employed. For this particular embodiment, one channel (first channel $C_1$) and one state transition (rising state transition $S_R$) are employed.

Figure 7:
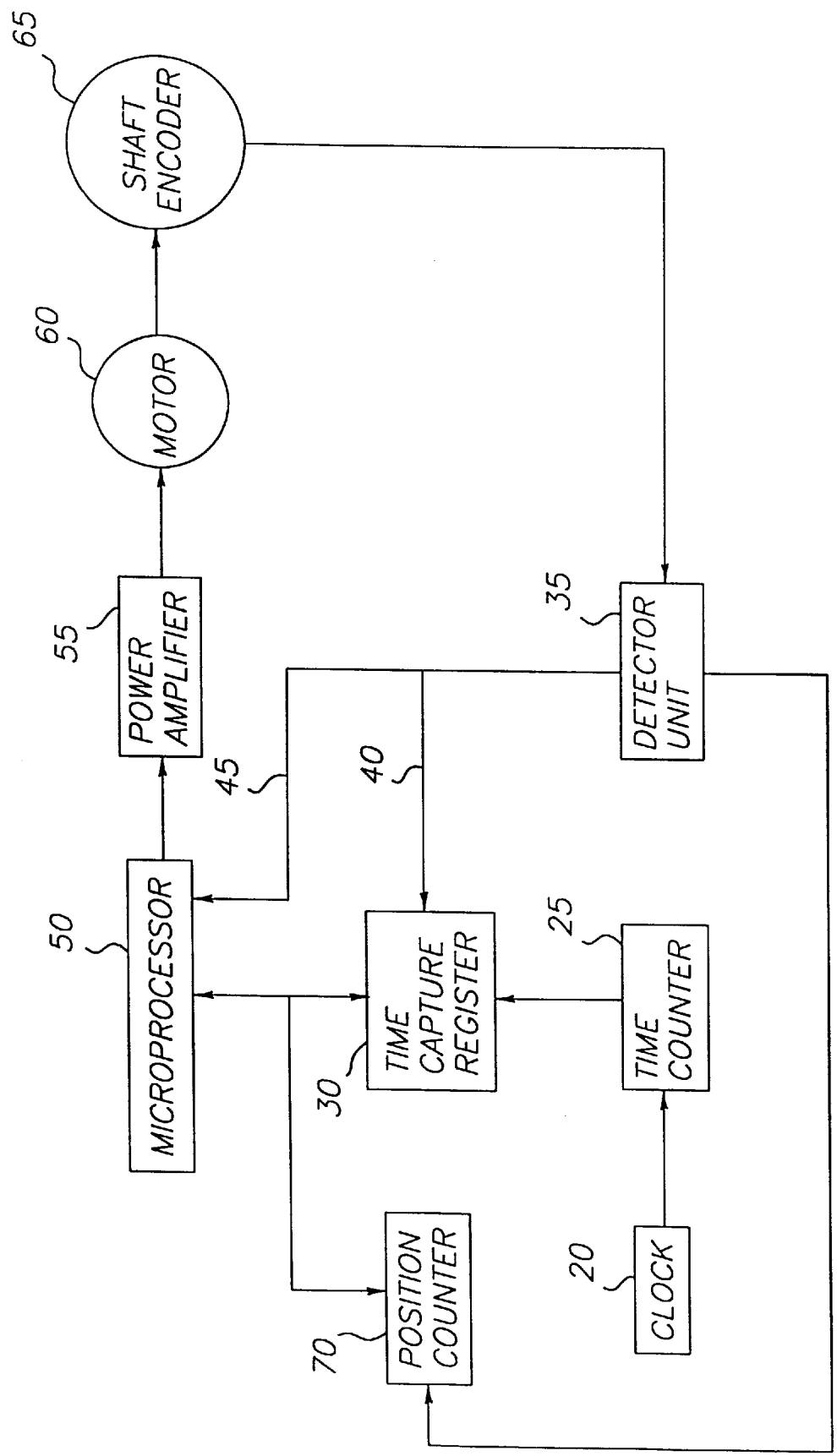
FIG. 7 shows a third embodiment of a motor speed control apparatus in accordance with the present invention.

Referring to FIG. 7, a motor speed control system utilizes an incremental optical encoder for position feedback and a microprocessor based controller. Measurements are made relative to a time reference 20, such as a 12.5 MHz crystal based time reference. Measurements are made using a time counter 25 to track time with the resolution of time reference 20 that is sufficiently frequent to provide adequate precision of the desired period.

For the particular embodiment, assume first channel $C_1$ has an encoder signal frequency of 2 KHz, and motor speed control is to be at a level of 0.1 percent (i.e., 1 part in 1000). Therefore, the clock would have a minimum frequency of 2 MHz (i.e., 1000 * 2 KHz).

A time capture register 30 captures and retains the value of time counter 25 when a state transition occurs. A detector unit 35 is a 2 channel quadrature state transition detector with a direction discriminator. When detector unit 35 detects rising state transition $S_R$ (e.g., a state transition event), a signal 40 is sent to time capture register 30, and a signal 45 is sent to a microprocessor 50. When signal 45 is received by microprocessor 50, microprocessor 50 obtains a corresponding capture time from counter 25. This old capture time $T_{n-1}$ (or time zero $T_0$) is subtracted from the new capture time $T_n$, for rising state transition $S_R$, to calculate the period P. The new capture time value is stored to be used as the start time for the next time detector unit 35 detects rising state transition $S_R$. The calculated frequency (1/P) based on the measured value of the period P is compared to a desired speed value of the motor. The difference, or error, is amplified by a power amplifier 55, and fed to motor 60, where an encoder provides a signal representative of the new speed of motor 60. If two state transitions are employed, this process would be repeated for falling state transition $S_F$. If two channels are employed, the process would be repeated for rising $S_R$ and falling $S_F$ state transitions of both channels.

A position counter 70 may be employed. Such a position counter, when employed with a detector unit 35 which is a 2 channel quadrature transition detector unit with direction discriminator, can provide an up/down counter with information for tracking encoder position, and accordingly, corresponding motor position.

To select a speed which provides an optimization between update rate and measurement precision, the capture conditions must be devised so as to selectively capture and generate an interrupt on the state transitions $S_R, S_F$. If, for discussion purposes only, it is desired to operate the particular example at quarter speed, the channel frequency would be 500 Hz (i.e., 0.25×2 KHz). The delay between feedback updates would change from 0.0005 seconds (at the 2 KHz rate) to 0.002 seconds (at the 500 Hz rate). Such a delay may cause the servo control system to provide substantially lower performance in speed regulation, particularly when subjected to external disturbances. The delay can be reduced by utilizing both the rising and fall state transitions of two encoder channels. This would retain the 2 KHz update rate and provide the benefit of 4 times the precision of measurement given the same clock (i.e., 12.5 MHz) since the periods being measured are four times longer.

Error Compensation and Characterization

The frequency at each transition state is a precise measure derived as the reciprocal of the time period nP for the previous encoder full period. However, since the speed of the motor is being controlled, the instantaneous speed of the motor may be changing throughout the measurement period. Accordingly, the frequency measurement is an average over the measurement time period. As such, the motor speed corresponding with the frequency is an average motor speed of the time period. Assuming that any speed changes over the time period are generally linear, the average motor frequency provides an appropriate representation of the motor speed at the mid-point of the time period nP. Thus, the frequency represents the speed at one-half the fall period previous in time.

This is a component of the total delay which occurs between the speed measurement and the feedback control, and is dependent on the full period frequency. It is not affected by obtaining more frequent full period measurements by using every state transition. In some instances, this component of the total delay can be a significant factor in adequate servo control performance. If so, making half or quarter period measurements may be desirable. However, since the variability in half or quarter period measurements is too large for good speed control, the variability must be characterized and compensated for.

To provide a method of characterizing and compensating for errors in the quarter periods of the optical encoder, the motor can be operated at a suitably fast speed during a calibration mode to allow the speed of the motor to be well controlled using a full period measurement for feedback. Correction factors for each unique state transition may be determined to normalize the corresponding quarter period and stored for subsequent use during a normal mode operation. Consequently, improved performance may be obtained at slower speeds during normal operation by utilizing the calibration mode stored information to correct quarter period errors by normalizing them.

For example, a calibration mode speed would be used which operated the motor at a speed faster than normal mode operation. At this calibration speed, measurements would be taken and stored for each quarter period, using the encoder's once-per-revolution reference channel signal to provide synchronization of the stored information. Each period's stored measurement information would then be divided into the nominal period expected value in order to calculate a correction factor for each quarter period. Then during the operational speed, the stored information would be used to mathematically compensate for the quarter period interval variability of the encoder signal. This compensation allows precision velocity control with less than fall period measurement.

For example, at a calibration speed with a 2 KHz frequency, the period would be 0.0005 seconds, and the quarter period nominal time would be 0.000125 seconds. If a first quarter period Q1 is measured as 0.000100 seconds, then 0.000125 divided by 0.0001000 equals 1.25, which would be the correction factor stored, for example in a table format. With a system having a 5000 optical line encoder, the normalization process would be conducted for each of the 20,000 quarter periods. When operating in the operational mode, each quarter period measurement would be multiplied times it's corresponding stored correction factor to provide a normalized measurement that could be used in obtain frequent feedback update information with a minimal amount of delay, yet provide suitable performance capability.

As each new frequency (i.e., speed) measurement is completed, the controlled motor torque can be adjusted to correct the motor speed. The signal to the motor can be derived from the frequency error using a variety of known algorithms, including the PI (Proportional plus Integral) method. A processor which is capable of handling more sophisticated algorithms could be suitable for measuring both frequency error and phase error of the two encoder channels. The frequency error is the difference between a reference frequency (that relates to the desired motor speed) and a reciprocal of the time period measured for the encoder signals. The phase error is a measure of time difference between when state transition events on the optical encoder occur relative to corresponding events that are synthesized by the time counter and derived from the time reference. A proportional servo loop is closed on the frequency error which provides a rate feedback and has a derivative characteristic that improves stability. An additional proportional plus integral servo loop on phase error is then used to force the frequency and phase to be substantially locked into synchronization with the reference.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A method for controlling motor speed, comprising:
   (a) providing an encoder in mechanical association with a motor, the encoder having a first encoder channel;
   (b) generating a first periodic encoder signal from the first encoder channel representative of instantaneous motor positions from which corresponding instantaneous motor speeds can be derived, the first encoder signal having a rising and a falling state transition for each period of the first encoder signal;
   (c) alternatingly determining a frequency of the rising and falling state transitions, the frequency of the rising and falling state transitions representative of a first and second instantaneous motor speed, respectively;
   (d) comparing the first and second instantaneous motor speed with a predetermined motor speed and generating a first and second error signal, respectively, representative of the difference; and
   (e) alternatingly affecting the speed of the motor dependent on the first and second error signals.

2. A method for controlling motor speed, comprising:
   (a) providing an encoder in mechanical association with a motor, the encoder having an encoder channel;
   (b) generating an encoder signal having a period P representative of instantaneous motor positions from which corresponding instantaneous motor speeds can be derived, the encoder signal having a state transition for each period P of the encoder signal;
   (c) determining a frequency of the state transition by measuring said frequency over a longer interval of time, said interval of time being defined by the rising or falling edge of a first pulse and the rising or falling edge of a second pulse wherein said second pulse is greater than at least one period away from said first pulse, and wherein the frequency of the state transition is representative of an instantaneous motor speed;
   (d) comparing the instantaneous motor speed with a predetermined motor speed and generating an error signal representative of the difference; and
   (e) affecting the speed of the motor dependent on the error signal.

3. A method for controlling motor speed, comprising:
   (a) providing an encoder in mechanical association with a motor, the encoder having a first and second encoder channel;
   (b) generating a first periodic encoder signal from the first encoder channel representative of instantaneous motor positions from which corresponding instantaneous motor speeds can be derived, the first encoder signal having a first and a second state transition for each period of the first encoder signal;
   (c) generating a second periodic encoder signal from the second encoder channel representative of instantaneous motor positions from which corresponding instantaneous motor speeds can be derived, the second encoder signal having a third and a fourth state transition for each period of the second encoder signal;
   (d) alternatingly determining a frequency of the first, second, third, and fourth state transitions, the frequency of the first, second, third, and fourth state transitions representative of a first, second, third, and fourth instantaneous motor speed, respectively;
   (e) comparing the first, second, third, and fourth instantaneous motor speed with a predetermined motor speed and generating a first, second, third, and fourth error signal, respectively, representative of the difference; and
   (e) alternatingly affecting the speed of the motor dependent on the first, second, third, and fourth error signals.

4. A method of controlling motor speed, comprising:
   (a) providing a pre-determined operational speed of a motor;
   (b) providing an encoder in mechanical association with the motor, the encoder adapted to generate an encoder signal representative of instantaneous motor positions from which corresponding motor speeds can be derived;
   (c) operating the motor at a predetermined calibration speed which is greater than the operational speed, the calibration speed having a nominal period P;
   (d) at the calibration speed, measuring each actual quarter period ¼P;
   (e) determining and storing a correction factor for each quarter period to normalize the quarter period; and
   (f) operating the motor at the operational speed utilizing each stored correction factor for the corresponding quarter period to mathematically compensate for the quarter period interval variability of the encoder signal.

5. A method for controlling motor speed, comprising:
   (a) providing an encoder in mechanical association with a motor, the encoder having an encoder channel;
   (b) generating a periodic encoder signal from the encoder channel representative of instantaneous motor positions from which corresponding instantaneous motor speeds can be derived, the encoder signal having a rising and, a falling state transition for each period P of the first encoder signal;
   (c) alternatingly determining a frequency of the rising and falling state transitions over a multiple period interval nP wherein n is an integer greater than 1, the frequency of the rising and falling state transitions representative of a first and second instantaneous motor speed, respectively;
   (d) comparing the first and second instantaneous motor speeds with a predetermined motor speed and generating a first and second error signal, respectively, representative of the difference; and
   (e) alternatingly affecting the speed of the motor dependent on the first and second error signals.

* * * * *